US008531392B2

(12) United States Patent
Branton et al.

(10) Patent No.: US 8,531,392 B2
(45) Date of Patent: Sep. 10, 2013

(54) MULTIFUNCTIONAL SCROLL SENSOR

(75) Inventors: Steve B. Branton, Ventura, CA (US);
Jeffrey R. Baker, Thousand Oaks, CA
(US); David Lee Stallard, Camarillo,
CA (US); Dustin J. Luck, West Hills,
CA (US)

(73) Assignee: Interlink Electronics, Inc., Camarillo, CA (US)

( * ) Notice: Subject to any disclaimer, the term of this patent is extended or adjusted under 35 U.S.C. 154(b) by 2072 days.

(21) Appl. No.: 11/192,619

(22) Filed: Jul. 29, 2005

(65) Prior Publication Data

US 2006/0028454 A1   Feb. 9, 2006

Related U.S. Application Data

(60) Provisional application No. 60/598,684, filed on Aug. 4, 2004.

(51) Int. Cl.
*G09G 5/00* (2006.01)
(52) U.S. Cl.
USPC ............ 345/156; 345/169; 345/173; 345/174
(58) Field of Classification Search
USPC .................................. 345/156, 169, 173–179
See application file for complete search history.

(56) References Cited

U.S. PATENT DOCUMENTS

| 4,482,883 | A | 11/1984 | Heredero |
| 4,494,105 | A | 1/1985 | House |
| 5,151,677 | A | 9/1992 | Gernet et al. |
| 5,353,004 | A | 10/1994 | Takemoto et al. |
| 5,867,158 | A * | 2/1999 | Murasaki et al. ............. 715/785 |
| 5,952,912 | A | 9/1999 | Bauer et al. |
| 7,046,230 | B2 * | 5/2006 | Zadesky et al. ............... 345/156 |
| 2005/0134576 | A1 | 6/2005 | Lin et al. |
| 2005/0140661 | A1 | 6/2005 | Collins |
| 2006/0033721 | A1 | 2/2006 | Woolley et al. |
| 2006/0038796 | A1 | 2/2006 | Hinckley et al. |
| 2007/0086724 | A1 * | 4/2007 | Grady et al. .................... 386/46 |

* cited by examiner

*Primary Examiner* — William Boddie
*Assistant Examiner* — Leonid Shapiro
(74) *Attorney, Agent, or Firm* — Troutman Sanders LLP

(57) ABSTRACT

An apparatus and method for using a scroll sensor providing a touch sensitive control input surface for a plurality of control functions is provided. The input surface is divided into a plurality of regions. Each region is assigned to one of the plurality of control functions. At least one of these control functions accepts parametric control input. A first touch is received at one of the regions on the input surface. The control function assigned to the touched region is selected. If the selected control function is one of the control functions accepting parametric control input, a second touch on the input surface is received as parametric control input during an activation period for the selected control function. The second touch may be received as parametric control input at any point of the input surface.

22 Claims, 11 Drawing Sheets

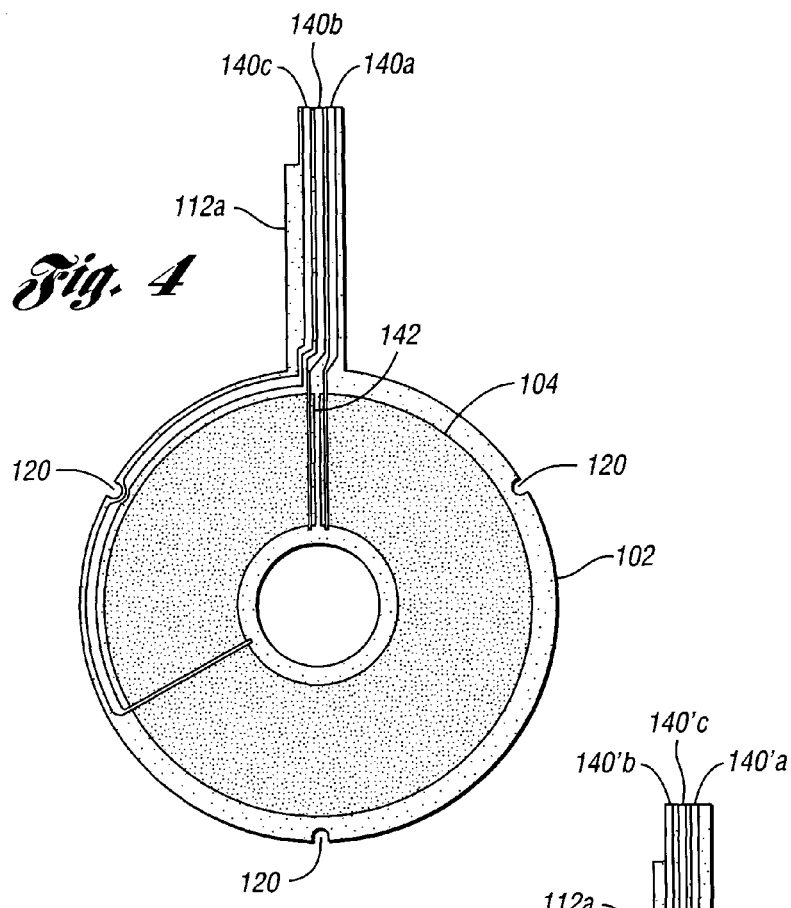
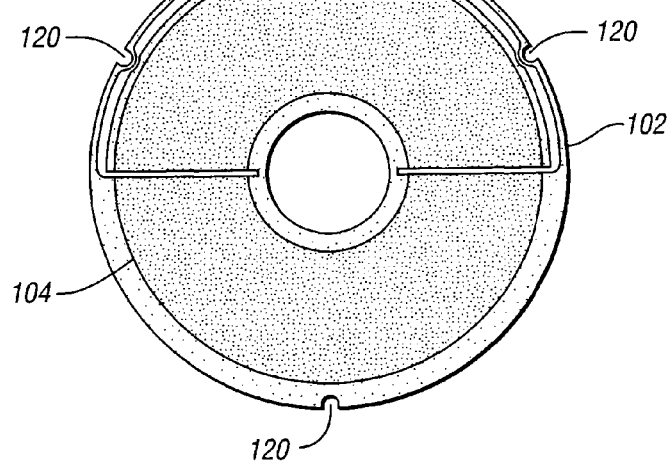

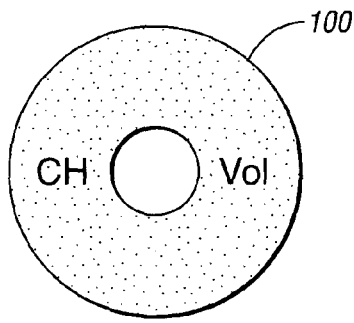
*Fig. 12*
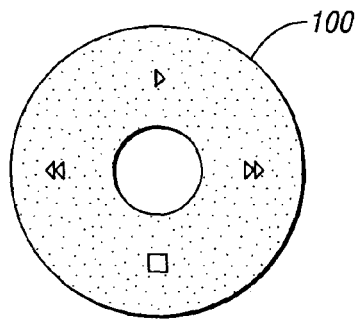
*Fig. 13*
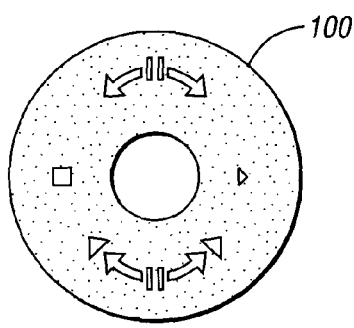
*Fig. 14*
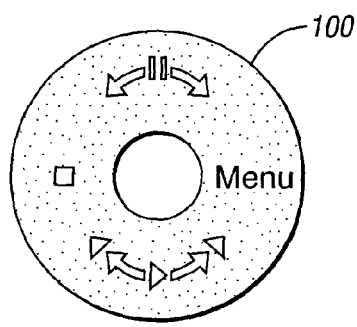
*Fig. 15*
*Fig. 16*
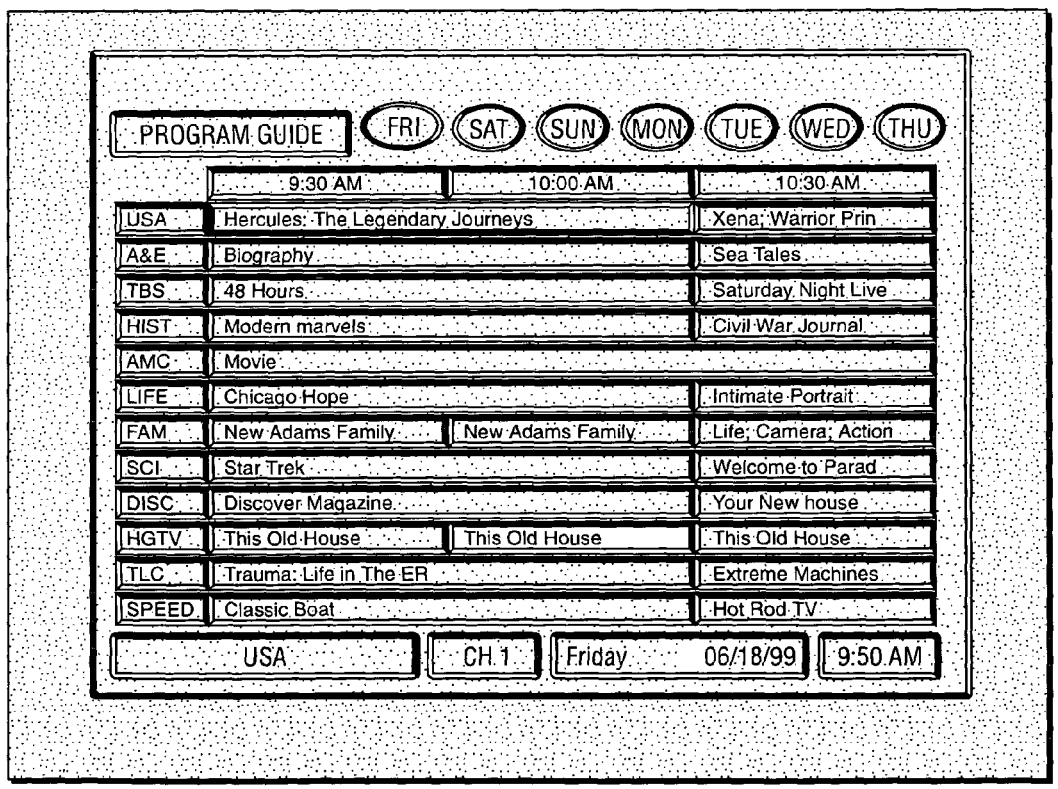

MULTIFUNCTIONAL SCROLL SENSOR

CROSS-REFERENCE TO RELATED APPLICATIONS

This application claims the benefit of the U.S. provisional application Ser. No. 60/598,684 filed Aug. 4, 2004.

BACKGROUND OF THE INVENTION

1. Field of the Invention

The present invention relates to interface devices allowing humans to provide control input.

2. Background Art

Portable or handheld consumer electronics, such as cell phones, music players, and remote controls, are continuously increasing their functionality and usefulness. There is a concomitant need to increase the efficiency and intuitiveness of the methods used to interact with and control these devices. One type of user input device that shows promise toward this goal is a rotational input.

Input devices that require a primarily rotational input include knobs, jog wheels, shuttle rings, scroll wheels in computer mice, and the like. These devices typically use rotational input to linearly vary some parameter such as audio volume. The most ubiquitous example is the tuner knob on a radio where the rotational motion of the knob is mechanically translated to linear motion of a frequency indicator. More fully electronic devices may have a knob or other rotational input device that causes linear action on some sort of electronic display, such as changing the length of a bar in proportion to volume as a knob is turned.

A common type of rotational input device for computers is the scroll wheel on a mouse. When rotated by a user, the scroll wheel may control various linear motions and actions in a graphical user interface. These motions may include movement of a scroll bar or the scrolling of text, web pages, or images. Also, individual software applications may incorporate extra functions for the scroll wheel such as the moving the linear indicators for volume and balance in several popular music software applications such as Winamp, musimatch, iTunes, and the like.

For small or portable electronics, knobs have the disadvantage of being rather large and protruding. Also, scroll wheels small enough to fit on portable devices may be too small to be easily usable. Jog wheels are one type of a planar rotational input device more aptly suited to small or portable electronics. Jog wheels are disk-like input devices that are typically freely and continuously rotatable. One example use is in video playback or editing equipment where rotating the jog wheel may cause the display of subsequent or prior video frames with some kind of time indicator displayed to show the relative position of the currently displayed frame.

A second type of rotational input device is a shuttle ring. This may be a ring that surrounds a jog wheel or may be a free-standing disk or knob. Typically a shuttle ring rotates through a fixed angle and when released may spring back to an original position. The ring may sense either the force with which it is rotated away from its original position, the angular distance rotated, or both. A shuttle ring is typically used to select the rate at which a parameter is changed. For example, rotating a shuttle ring may cause video frames to advance at a rate proportional to displacement. Rotating various amounts clockwise may cause various speeds of video fast forward, and counterclockwise rotation may cause rewind. In a similar fashion, rotating various amounts in either direction may cause audio volume or any other parameter to increase or decrease at a certain rate.

Although more planar than knobs, jog wheels and shuttle rings have the disadvantage of being primarily mechanical and, therefore, somewhat large. A relatively new class of rotational input devices that are completely planar is the annular touchpad. This is a planar annulus capable of sensing an angular position of touch and rotational motion. One such sensor is manufactured by Synpatics, Inc. and works by sensing capacitance changes caused by the presence of a finger. Another sensor is disclosed in commonly assigned U.S. Patent Application Ser. No. 60/572,155 titled "Annular Potentiometric Touch Sensor," filed May 18, 2004, which is incorporated herein by reference in its entirety. Like a knob or a disk, the annular touchpad can indicate rotational motion, the beginning and ending angles of the rotational motion, and the like. But unlike a knob or disk, the annular touchpad can indicate where a user first touches in order to initiate the rotational motion. This is analogous to a knob that could indicate where it was first grasped. The present invention capitalizes on this extra and unique capability of annular touchpads to enhance the efficiency and intuitiveness of user input to electronic devices.

An example system using an annular sensor is the Apple iPod. This device translates rotational input from an annular sensor into a control function. Various control functions include linear motion through menus or song lists, linear adjustment of a volume slider, and the like. The exact control function to which the rotary motion is mapped is context sensitive. The context may change only by means of a select button or other buttons.

What is needed is a human interface that immediately and intuitively allows for selection of functionality and parametric input. This interface should be small, inexpensive and easy to integrate with a wide variety of electronic devices.

SUMMARY OF THE INVENTION

The present invention provides a scroll sensor that enables one of a plurality of functions to be chosen based on the location of first contact with the scroll sensor. The initiation of different control functionalities does not require the pressing of a button, choosing from a menu, or other discrete and cumbersome selection step. Instead, the choice of functionality requires only that the rotational motion be initiated at a specific location.

A method of using a scroll sensor providing a touch sensitive control input surface for a plurality of control functions is provided. The input surface is divided into a plurality of regions. Each region is assigned to one of the plurality of control functions. At least one of these control functions accepts parametric control input. A first touch is received at one of the regions on the input surface. The control function assigned to the touched region is selected. If the selected control function is one of the control functions accepting parametric control input, a second touch on the input surface is received as parametric control input during an activation period for the selected control function. The second touch may be received as parametric control input at any point of the input surface.

In an embodiment of the present invention, the input surface is divided into a different plurality of regions based on the state of a controller.

In another embodiment of the present invention, the second touch is continuous with the first touch. In this case, the activation period may continue until the second touch is terminated. Alternatively, the activation period may continue for a preset amount of time after the second touch is terminated.

In various embodiments of the present invention, the control functions may include control of volume, channel selection, frequency, play list selection, stored digital item selection, media play velocity, media play position, and the like. Multiple control functions may include at least two navigation controls with the parametric control input for each navigation control specifying a desired change in navigation position such as moving a cursor, scrolling a list of displayed items, and the like. Control functions may also include at least one camera position control with the parametric control input specifying a desired change in a camera field of view (e.g., pan, tilt, zoom, focus, aperture). Control functions may further include at least one image viewing control with the parametric control input specifying a desired change in an image displayed view (e.g., pan, tilt, zoom).

An apparatus including a scroll sensor and a controller is also provided. The scroll sensor has an annular touch sensitive control input surface. The scroll sensor provides an output signal indicative of a touched position on the input surface. The controller receives a first signal from the scroll sensor indicating a first touch on the scroll sensor input surface. One of a plurality of control functions is selected based on the touched position. A second signal is received from the scroll sensor indicating a second touch on the scroll sensor input surface. Control input is provided for the selected function based on the touched position of the second touch.

In an embodiment of the present invention, the controller can change the control functions. The apparatus may include a display indicating which of the control functions are presently selectable.

A remote control for use with an entertainment system is also provided. The remote control includes a transmitter and a scroll sensor having an annular touch sensitive control input surface. A controller divides the touch sensitive control input surface into at least two regions, each region corresponding to one of a plurality of remote control functions. A first signal from the scroll sensor indicates a region selecting one of the remote control functions. A second signal from the scroll sensor provides parametric control input. The transmitter sends a signal specifying the parametric control input for the selected remote control function.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 4 is a top view of a bottom substrate having two closely spaced conductive traces according to an embodiment of the present invention;

FIG. 5 is a top view of a bottom substrate having two widely spaced conductive traces according to an embodiment of the present invention;

FIG. 12 is a schematic diagram illustrating channel selection and volume control functionality according to an embodiment of the present invention;

FIG. 13 is a schematic diagram illustrating video playback functionality according to an embodiment of the present invention;

FIG. 14 is a schematic diagram illustrating control of video playback and transport according to an embodiment of the present invention;

FIG. 15 is a schematic diagram illustrating control of a DVD player according to an embodiment of the present invention;

FIG. 16 is an on-screen electronic program guide navigable by the present invention;

DETAILED DESCRIPTION OF THE PREFERRED EMBODIMENT(S)

Figure 1:
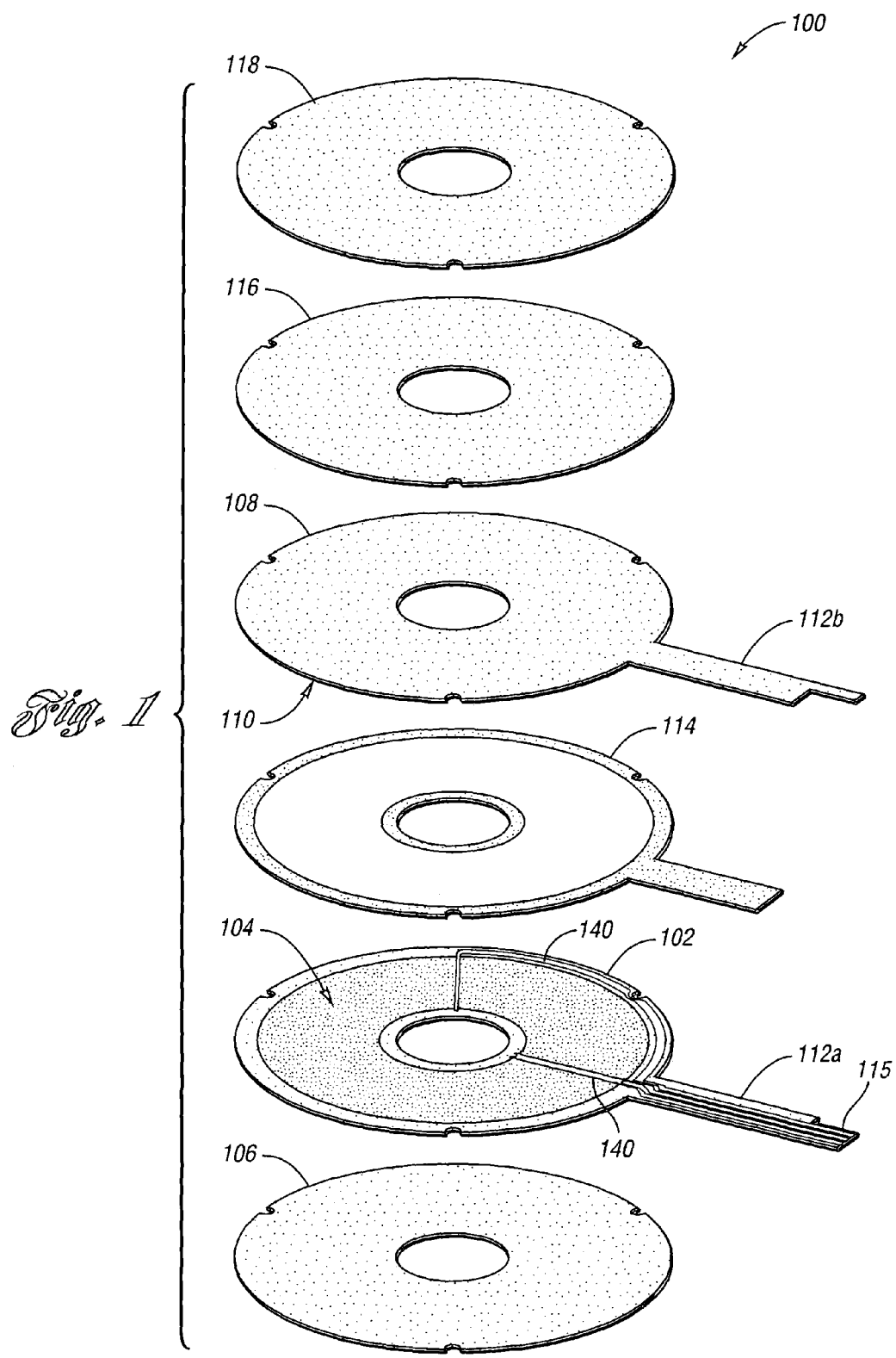
FIG. 1 is an exploded view drawing of a sensor according to an embodiment of the present invention.

Referring to FIG. 1, an exploded view drawing of a scroll sensor 100 according to an embodiment of the present invention is shown. The sensor 100 may be referred to as a ring sensor, scroll sensor, or multipurpose knob. The sensor 100 is a planar annulus potentiometric touch sensor for determining the angular location of a touch. The sensor 100 is "planar" in the sense that while it may be many tens of millimeters across, it is only approximately 0.5 mm thick. The sensor 100 is annular since it may comprise a ring or a partial arc of a ring. The sensor 100 is "potentiometric" in that it contains a resistive element across which a potential is placed and a sense element that contacts the resistive element such that the voltage seen by the sense element is proportional to the location of the contact. The sensor 100 is a "touch" sensor in that its size and operational force range are suitable for the detection of light human finger force.

Preferred embodiments are made of layers. A bottom substrate 102, which may be flexible or rigid, is deposited on its inside or top surface with an annular resistive material 104. Two or more highly conductive drive lines 140 intersect the resistive material 104, preferably traversing the resistor element. The resistive material 104 may be polymer thick film carbon ink that is screen printed in place. The highly conductive material may be polymer thick film silver ink.

A flexible top substrate 108 is deposited on its inside or bottom surface with a conductive sense layer 110. This sense layer 110 is analogous to the wiper of a mechanical potentiometer. The sense layer 110 may be a solid pattern or meshed with a grid pattern. The sense layer 110 is typically a silver polymer thick film, but may be carbon or other conductive or partially conductive material.

The bottom substrate 102 and the flexible top substrate 108 are held together at the inner and outer radii of the annulus by an adhesive spacer layer 114. The spacer layer 114 is thick enough to prevent the inner faces of the top 108 and bottom 102 substrates from contacting except when the flexible top substrate 108 or bottom substrate 102 is touched by a user (not shown).

The bottom substrate 102 may include a bottom pigtail extension 112a and top substrate 108 may include a top pigtail extension 112b. Each pigtail extension 112 may include electrical traces 115 for making electrical contact with drive lines 140, the sense layer 110 and other elements of the sensor 100 as will be further described below. The ends of the pigtail extensions 112 may include a connector or the pigtails 112 may be directly inserted into a connector as is known in the art. Other schemes for making electrical connections with the sensor 100 are also possible.

The sensor 100 may include a rear or bottom adhesive 106 for attaching the sensor 100 to a host device (not shown) such as a printed circuit board. The sensor 100 may also include a top adhesive layer 116 onto which is attached a top protective layer 118. The top protective layer 118 may be printed with a specific color, pattern, logo or the like.

The description of the present invention uses spatial references such as top and bottom for clarity only. The sensor 100 may be used in any orientation. Further, while the sensor 100 is generally described as operating with a touch on the top substrate 108 pushing the top substrate 108 onto the bottom substrate 102, the sensor 100 will also operate with a touch on the bottom substrate 102 pushing the bottom substrate 102 into contact with the top substrate 108.

Figure 2:
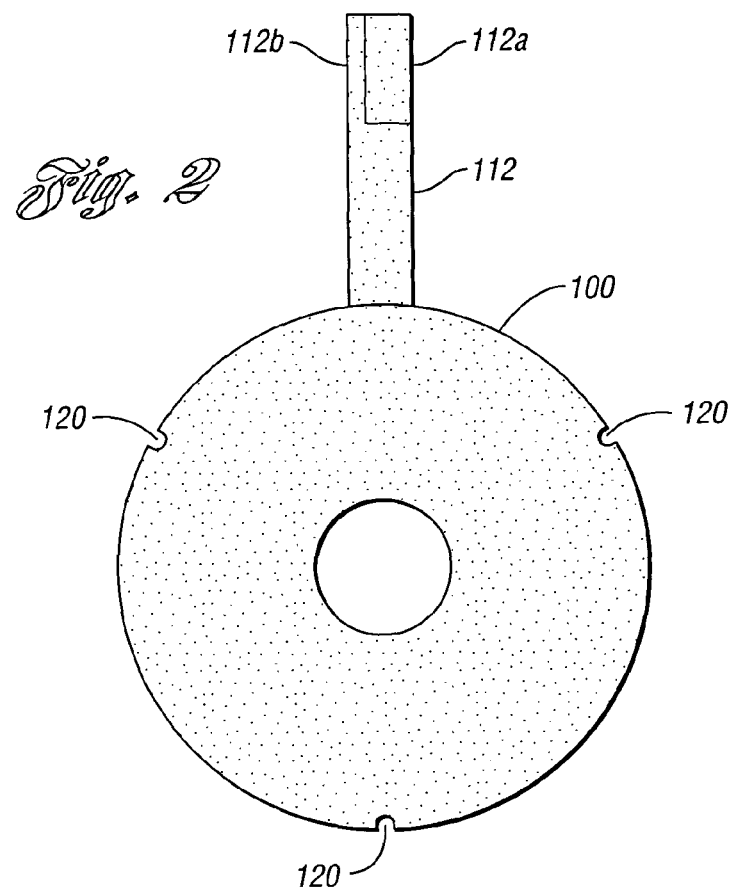
FIG. 2 is a top view drawing of a sensor according to an embodiment of the present invention.

Referring now to FIG. 2, a top view drawing of a sensor 100 according to an embodiment of the present invention is shown. The three notches 120 are for alignment with the host device. The tail 112 is for connection of the sensor 100 to the circuit of the host device. To simplify construction of the sensor 100, part of the tail 112 is the bottom pigtail 112a built from the bottom layer 102 and has conductors that face upwards. The other part of the tail 112 is the top pigtail 112b built from the top layer 108 and has conductors facing downward.

Figure 3:
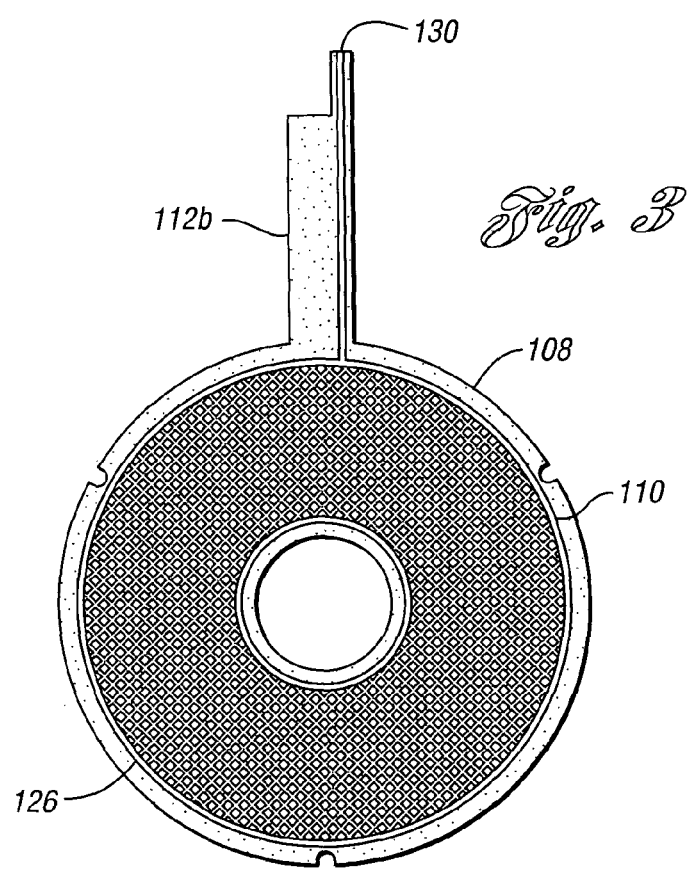
FIG. 3 is a bottom view of a top substrate according to an embodiment of the present invention.

Referring now to FIG. 3, a bottom view of a top substrate 108 according to an embodiment of the present invention is shown. The fine grid of highly conductive traces 126 forms the sense layer 110 that is pushed against the resistive ring 104 when the sensor 100 is touched. A single connection 130 to this layer extends down the top pigtail 112b.

Referring now to FIG. 4, a top view of a bottom substrate 102 having two closely spaced conductive traces (140a-140b) according to an embodiment of the present invention is shown. This embodiment has a gap 142 in the resistor ring 104 and three conductive lines (140a-140c). The two drive lines (140a-140b) near the gap 142 are used to set up an electrical potential around the ring 104. The third line 140c is a tie breaker. Conductive traces 140 for the drive lines (140a-140b) and tie breaker 140c extend down the bottom pigtail 112a.

Referring now to FIG. 5, a top view of a bottom substrate 102 having two widely spaced conductive traces (140'a-140'b) according to an embodiment of the present invention is shown. This embodiment has a continuous ring of resistive material 104 with two drive lines (140'a-140'b) located opposite each other on the ring 104. A tie breaker conductive trace 140'c intersects the resistive ring 104 at the top of the ring 104. Conductive traces 140' for the drive lines (140'a-140'b) and tie breaker 140'c extend down the bottom pigtail 112a.

Figure 6:
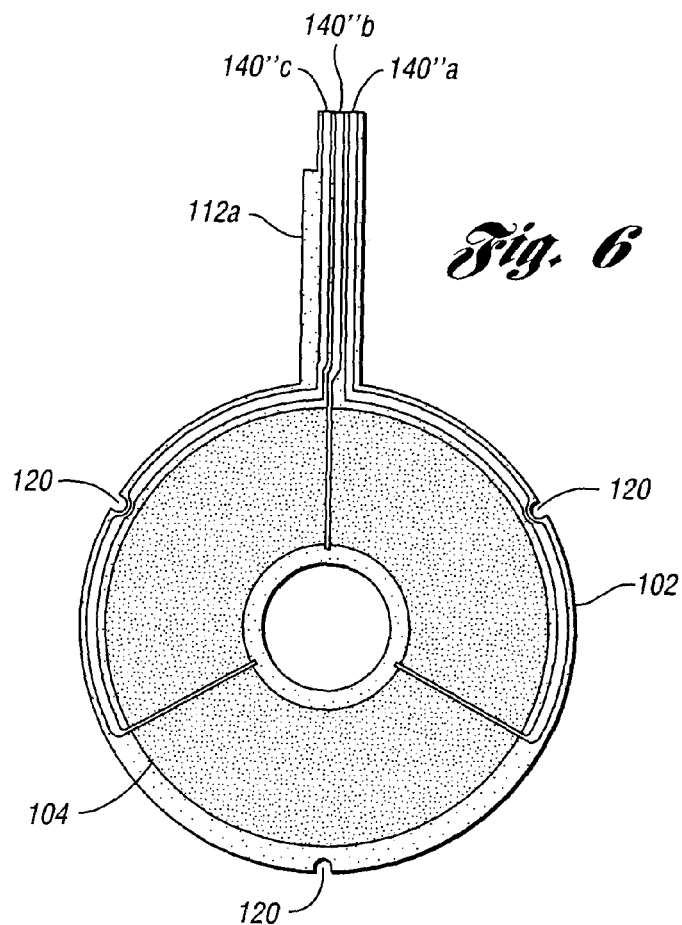
FIG. 6 is a top view of a bottom substrate having three conductive traces according to an embodiment of the present invention.

Referring now to FIG. 6, a top view of a bottom substrate 102 having three conductive traces 140" according to an embodiment of the present invention is shown. This embodiment has three drive lines (140"a-140"c) spaced at 120° intervals around the resistive ring 104. Conductive traces 140" for the drive lines (140"a-140"c) extend down the bottom pigtail 112a.

Figure 7A:
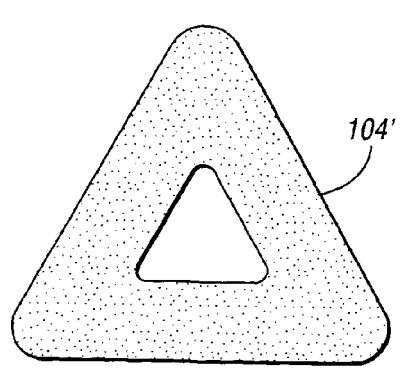
FIGS. 7a-7e are schematic diagrams of annular patterns of resistive material according to embodiments of the present invention.
Figure 7B:
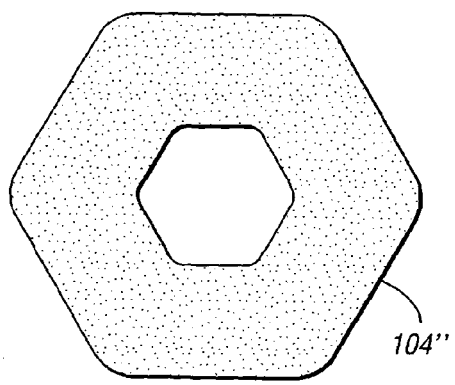
Figure 7C:
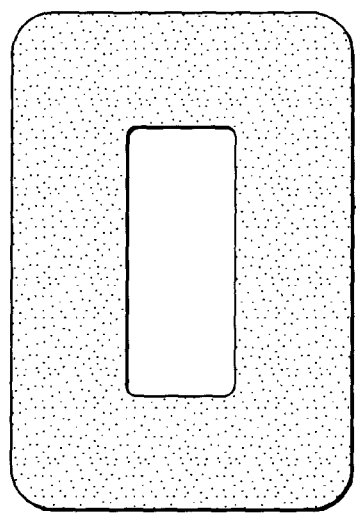
Figure 7D:
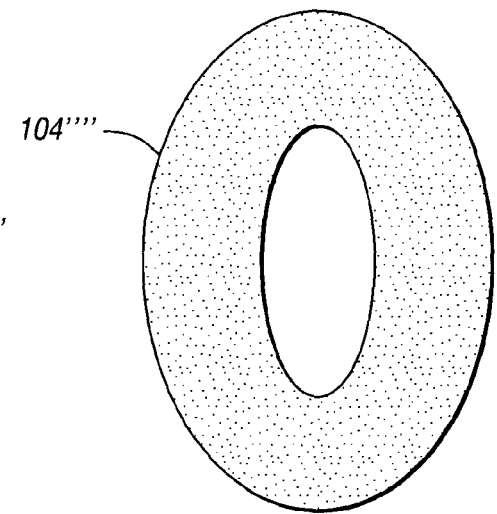
Figure 7E:
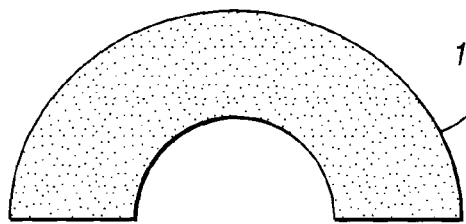

Referring now to FIGS. 7a-7e, schematic diagrams of annular patterns of resistive material (104'-104"") according to embodiments of the present invention are shown. In addition to a round or circular pattern of resistive material 104, a wide variety of annular shapes may be used. FIG. 7a illustrates a triangular annular region 104'. FIG. 7b illustrates a hexagonal annular region 104". FIG. 7c illustrates a rectangular annular region 104"'. FIG. 7d illustrates an ovoid annular region 104"". FIG. 7e illustrates a semicircular annular region 104""'. As will be recognized by one of ordinary skill in the art, a wide variety of resistive patterns may be used with the present invention.

Figure 8:
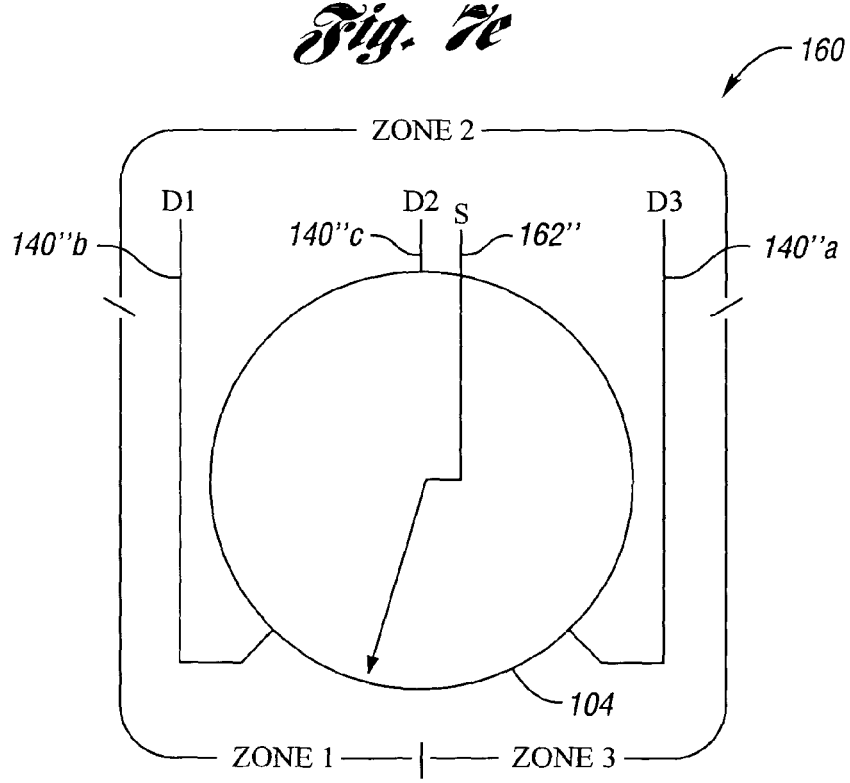
FIG. 8 is a schematic diagram of a sensor including three conductive traces and a sense line according to an embodiment of the present invention.

Referring now to FIG. 8, a schematic diagram 160 of a sensor 100 including three conductive traces 140" and a sense line 162" according to an embodiment of the present invention is shown. The sensor 100 has four connections. Three of the connections (i.e., D1-D3) are drive lines 140" for the resistor ring 104. The fourth line (i.e., S) is the sense line 162".

Algorithms for measuring this sensor 100 may be implemented in any small microcontroller. Described below is an algorithm using one eight-bit analog-to-digital converter (ADC) and three general purpose I/O lines. Instead of an ADC, an op-amp voltage follower and a slope converter may be used.

In the following discussion, straight north (i.e., straight up) is 0° (12 o'clock) and the angle increases clockwise. The sensor 100 is oriented with the tail at 12 o'clock, placing the drive lines 140" at 0°, 120° and 240°. The ring sensor 100 may be thought of as divided into three zones, with zone 1 defined as the 120° segment centered on D1, zone 2 as the 120° segment centered on D2, and zone 3 as the 120° segment centered on D3.

The first part of the algorithm determines which zone is being touched. The goal is to determine which drive line (i.e., 140"a-140"c) is closest to the point of touch so that the other two drive lines can be used in a later step to determine the precise touch location. Finding which drive line is closest to the point of touch can be done with three measurements. In each measurement, two of the drive lines are set high and one is set low. The closest drive line will be the one with the lowest ADC reading. Following are detailed steps for this measurement:

1. Set lines D2 (i.e., 140"c) and D3 (i.e., 140"a) high, and D1 (i.e., 140"b) low.
2. Measure the sense line S (i.e., 162") using the ADC. Call this V1.
3. Set lines D1 and D3 high, and D2 low.
4. Measure the sense line S using the ADC. Call this V2.
5. Set lines D1 and D2 high, and D3 low.
6. Measure the sense line S using the ADC. Call this V3.

Then following code can be used to determine which zone is being touched:

```
if(V1 <= V2)
{
    if(V1 <= V3)
        zone = 1;
    else
        zone = 3;
}
else
{
    if(V2 < V3)
        zone = 2;
    else
        zone = 3;
}
```

Once the zone of touch is known, the actual angular touch position can be measured. The angle can be measured with a single measurement. The rule is to drive the two lines that are furthest from the touch point to perform the angle measurement. For example, if zone 1 is being touched, then drive lines two and three (i.e., D2, D3) will be used for the angle measurement. Following are steps for measuring the angle if zone 1 is being touched:

1. Configure drive line D1 as an input, effectively disconnecting it from the sensor.
2. Set D3 low and D2 high (so that the potential increases clockwise).
3. Measure the sense line S using the ADC. This measurement will be referred to as Vtheta.

The angular resolution may be improved by measuring Vtheta several times and accumulating or averaging the results.

Because the ADC may be mixed with a few counts of noise, a second measurement could be performed to "sanity check" the results. This would be exactly the same as the measurement described above, but with the drive lines set so that the potential increases counterclockwise. In the zone 1 example, D2 would be set low and D3 would be set high. The voltage from this measurement may be referred to as Vtheta_inverse. Vtheta and Vtheta_inverse should be complements. The following code example checks this condition:

if(abs(255−Vtheta−Vtheta−inverse<10)
        sensor_active_flag=1;

In other words, if Vtheta and the complement of Vtheta_inverse are not equal to within some tolerance (e.g., 10 counts), then no valid touch was found (i.e., sensor_active_flag=0).

Once Vtheta has been measured and the touch confirmed, the angle of touch can be calculated. In the example provided, the voltage Vtheta was measured by applying 256 counts over an angle of 240°. Voltage can therefore be converted to angle by multiplying by 240/256. Conveniently, 240/256 reduces to the ratio 15/16. If the touch was in zone 1, 120° must be added to the angle. If the touch was in zone 2, 240° must be added to the angle. And if the touch was in zone 3, no offset is required. Finally, the result should be checked to see if it exceeds 359°. The following code example shows the complete conversion of Vtheta to angle theta:

```
theta=(Vtheta*15)/16;    //convert from voltage to angle
if(1==zone)              //Add necessary offsets
    theta+=120;
else if (2==zone)
    theta+=240;
else if (3==zone)
    theta+=0;
if(theta>359)            //sanity check angle
    theta−=360;
```

Because consecutive samples may straddle the rollover from 359° to 0°, a compensation may be used for averaging multiple samples. For example, a simple average of 358° and 2° would give 180° whereas the average should give 0°. Although several methods are possible, the following is very simple and does not require extensive code. In this description, theta[0] is the most recent measurement, theta[1] is the next most recent, and theta[n] is the $n^{th}$ measurement.

First, an average is calculated. Then the average is compared with theta[0]. If the average and theta[0] are too different (such as, for example, greater than 50°), then it is assumed that the zero-crossing problem has occurred. If so, all small angles are offset by 360° and average recalculated. If the result ends up greater than 359°, 360° is subtracted from the result. Following is a code example:

```
tempint = (theta[0]+theta[1]+theta[2]+theta[3])/4;
if(abs(tempint − theta[0]) > 50)    //If avg is weird
{
    tempint=0;
    for(loop=0; loop<4; loop++)
    {
        tempint+=theta[loop];
        if(theta[loop] < 50)        //If angle is small
            tempint+=360;           // add 360°
    }
    tempint/=4;
}
if(theta_out>359)
    theta_out−=360;
```

Figure 9:
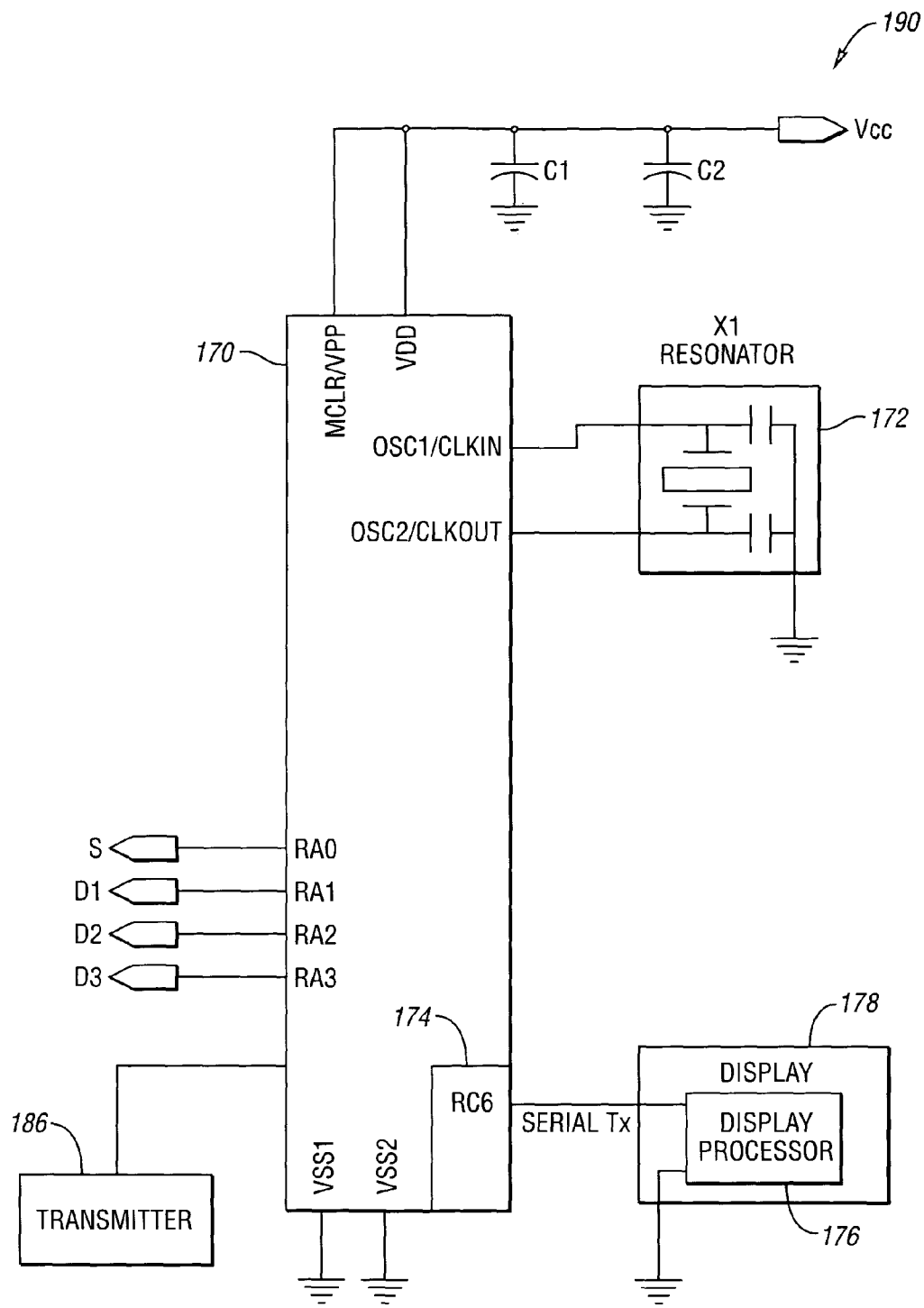
FIG. 9 is a schematic diagram of a processor according to an embodiment of the present invention.

Referring now to FIG. 9, a schematic diagram 190 of a processor 170 according to an embodiment of the present invention is shown. Logic may be implemented in a microprocessor 170 for determining the touch location. The system 190 may include clock circuitry 172, serial communication circuitry 174, and the like as is commonly used with microcontrollers. In the embodiment shown, the microcomputer 170 includes one analog-to-digital converter (ADC) input line (i.e., RA0) for the sense line S. In addition, three lines (i.e., RA1-RA3) are used for driving the D1, D2 and D3 lines. Each of these is configurable independently as output high, output low or high-impedance input.

The system 190 of FIG. 9 may be used in a remote control by including a transmitter 186 controlled by the microcontroller 170. The transmitter 186 accepts electrical input, such as a digital baseband signal, and produces a modulated output as is known in the art. Output may be in the form of infrared light, radio waves, ultrasound waves, and the like.

The system 190 of FIG. 9 may also include a display 178. In the embodiment shown, the microcontroller 170 issues display commands to a display processor 176 over a serial link. The display processor 176 drives a display 178, such as an LCD screen, that is integrated into a remote control, music player, portable digital information storage device, and the like. Alternatively, the display 178 may be separate, such as a television screen, computer screen, appliance screen, dashboard screen, and the like.

In the present invention, the touch sensor 100 permits selecting between multiple control functionalities. For example, the sensor 100 (i.e., ring, input surface) may be divided into one or more logical regions based on the state of the controller 170. That is, one or more regions may be defined on the input surface 100 based at least in part on the state of the controller 170. Each region may be assigned to a control function. Accordingly, each specific control function may be initiated by touching the corresponding region of the sensor 100.

Once a specific function is chosen, an activation period begins. At any time during the activation period, regardless of where the rotational motion may proceed, the entire ring has the initiated functionality. This selection process and subsequent parametric input may be implemented as code in the microcontroller 170. Alternatively, touch positions may be transmitted to a remote controller (not shown) which implements function selection and parameter interpretation.

A single activation may be defined as being initiated by a touch and continuing until the sensor 100 is no longer touched. Alternatively, a single activation may be defined as being initiated by an initial touch and continuing for a certain amount of time after the sensor 100 is no longer touched, so that a second touch within a specified amount of time qualifies as belonging to same activation.

The advanced method of using a ring sensor 100 could be a useful input device in any of several portable or handheld electronic devices. Examples of portable handheld devices include remote controls for use with home entertainment systems, portable music players, cell phones, portable digital assistants, GPS systems, portable data storage devices, and the like.

Simple single-touch controls may be interspersed with scrolling controls. For example, in the example of video transport control below, "play"# and "stop" do not require further rotational input after the initial touch.

The state of the controller 170 (i.e., function and/or set of functions offered) may be varied based on input from additional controls or through a hierarchical control system implemented with the ring. In either case, the microcontroller 170 may hold a state variable indicating which control functions are currently available. Each function may be indicated by an icon on the ring or near the ring. If the functionality is variable, these icons may be changed on the display 178.

Figure 10:
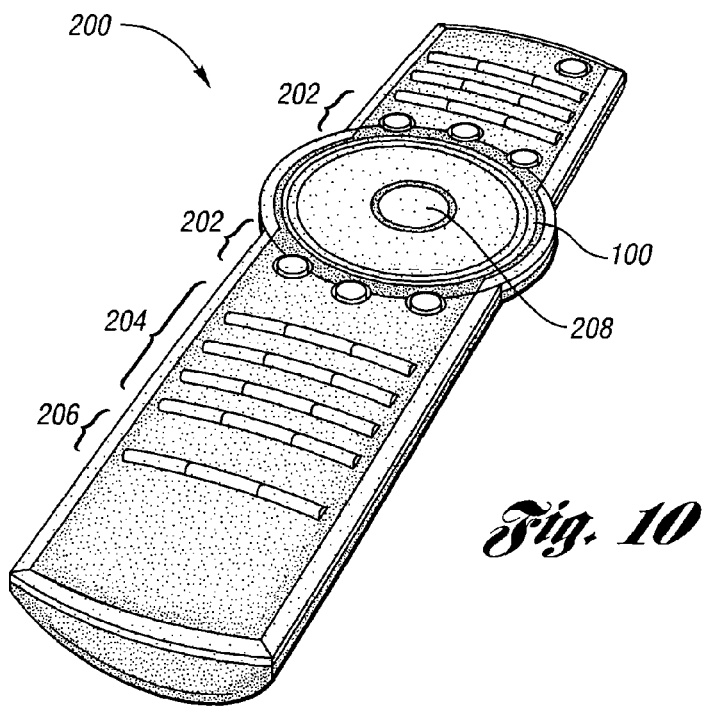
FIG. 10 is an isometric view illustrating a remote control including a scroll sensor according to an embodiment of the present invention.

Referring now to FIG. 10, an isometric view illustrating a remote control 200 including a scroll sensor 100 according to an embodiment of the present invention is shown. The remote control 200 includes a circular scroll sensor 100. Pushbuttons 202 located near the periphery of the scroll sensor 100 may be used to select the set of functions selectable by a first touch of the scroll sensor 100. The remote control 200 also includes a numeric keypad 204 and various mode select buttons 206. A control button 208 may also be included in the center of the scroll sensor 100.

Figure 11:
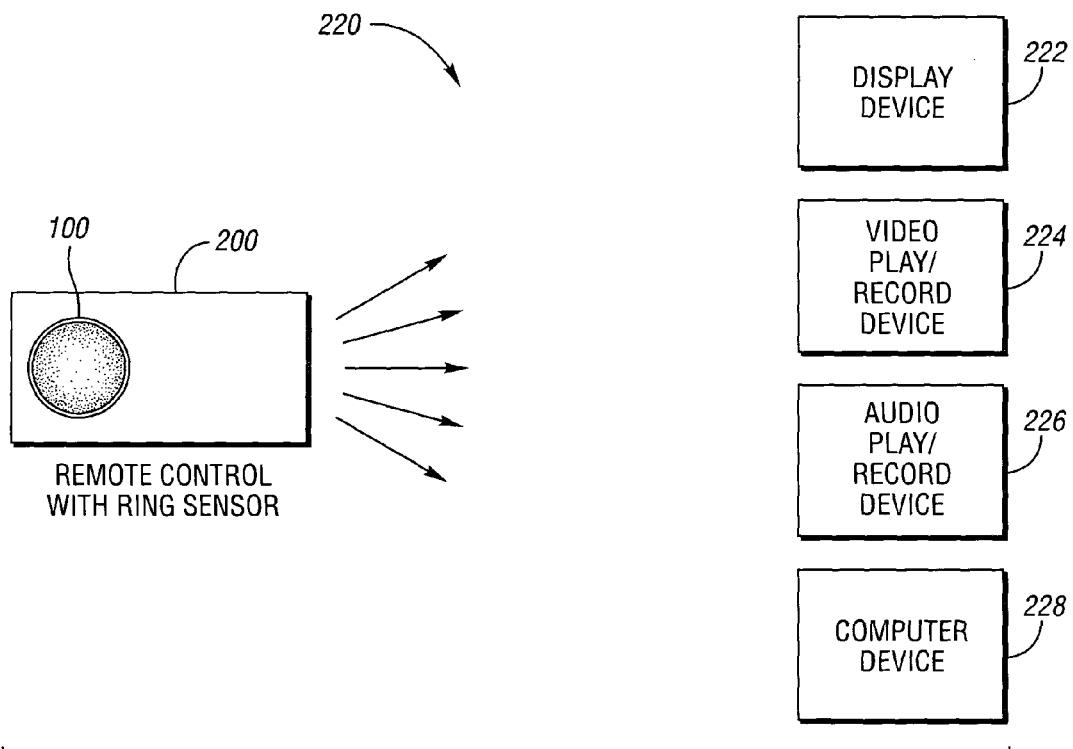
FIG. 11 is a block diagram of a home entertainment system according to an embodiment of the present invention.

Referring now to FIG. 11, a block diagram of a home entertainment system 220 according to an embodiment of the present invention is shown. The entertainment system 220 may include components such as a computer 228, a television or other display device 222, audio recording and/or playback devices 226 (e.g., stereo, music players, etc.), video recording and/or playback devices 224, and the like. The remote control 200 typically includes a housing with the scroll sensor 100 situated on a top face. Typically, each device to be controlled understands a limited set of commands. For example, a television, cable box or satellite tuner may accept commands to turn on, turn off, increase volume, decrease volume, increase channel, decrease channel, receive channel digit, and the like.

The remote control 200 provides multiple functions simultaneously through the annular scroll sensor 100. A first touch selects one of these functions, based on the area of the scroll sensor 100 touched. A second touch provides input for the function. An example is provided in FIG. 12. The scroll sensor 100 is logically divided into two regions, roughly indicated as the left half and the right half. The left half, indicated by "CH," provides channel selection. The right half, indicated by "Vol," provides volume control. By first touching the left area and then scrolling clockwise or counterclockwise, a user can continuously increase or decrease, respectively, the television channel. By first touching the right area and then scrolling clockwise or counterclockwise, a user can continuously increase or decrease, respectively, the volume. In either case, the remote control 200 receives the first touch, noting in which region the scroll sensor 100 was touched, then waits for a second touch before transmitting control signals.

Referring now to FIG. 13, a schematic diagram illustrating video playback functionality according to an embodiment of the present invention is shown. Control functions arrayed around the ring 100 (clockwise from top) are play, fast forward, stop, and rewind. Touching first at the top will play video at normal speed. Touching first at the bottom will stop video playback. Touching first at the right or left while video is playing will play the video at a fixed higher speed forward or reverse. Touching first at the top then scrolling clockwise or counterclockwise will play video forward or reverse at a higher speed that is proportional to the distance scrolled.

Referring now to FIG. 14, a schematic diagram illustrating control of video playback and transport according to an embodiment of the present invention is shown. Control functions arrayed around the ring 100 (clockwise from top) are jog control, play, shuttle control, and stop. If touched first at the right edge, video is played at normal speed. If touched first at the left edge, video is stopped. Touching at the top will pause the video. Scrolling away from the top will jog the video, frame by frame in either direction, at a speed that is proportional to the scrolling speed. Ceasing touching will leave the video paused at the desired frame. Touching first at the bottom will also pause the video. Scrolling away from the bottom in either direction will cause video to play at a speed that is proportional to the distance scrolled away from the bottom. This speed may range from very slow motion to very fast advance, in either direction forward or reverse. Ceasing touching will leave the video playing in the chosen direction at the chosen speed.

Referring now to FIG. 15, a schematic diagram illustrating control of a DVD player according to an embodiment of the present invention is shown. DVD players, because of the menu structures provided on many DVDs and the random-access availability of information segments, are particularly well suited to control with a scroll wheel sensor 100. Arrayed around the ring 100 clockwise from the top are jog control, menu scrolling, shuttle control, and stop.

If touched first at the bottom edge, near the center of the shuttle control, video is played at normal speed. Scrolling away from the bottom in either direction will cause video to be played at a speed that is proportional to the distance scrolled away from the bottom. This speed may range from very slow motion to very fast advance, in either forward or reverse, depending upon the direction of the second touch. Ceasing touching will leave the video playing in the chosen direction at the chosen speed. Touching first at the left edge stops the video. Touching at the top will pause the video. Scrolling away from the top will jog the video, frame by frame in either direction, at a speed that is proportional to the scrolling speed. Ceasing touching will leave the video paused at the desired frame. Touching first at the right edge and then scrolling will scroll through currently available menu items, if any, in a cyclical manner. Releasing over a menu item will select that item. This permits multiple levels of menus to be navigated. Alternatively, an item could be selected by pressing a separate button that may be located in the center of the scroll sensor 100 or elsewhere.

Figure 17:
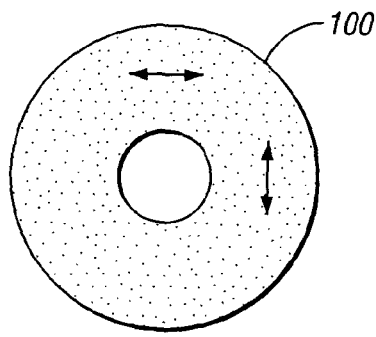
FIG. 17 is a schematic diagram illustrating controls for navigating an electronic program guide according to an embodiment of the present invention.

Referring now to FIGS. 16 and 17, a navigable on-screen electronic program guide 234 and a schematic diagram illustrating navigation controls, respectively, according to an embodiment of the present invention are shown. Current scroll input sensors 100 are limited to one-dimensional navigation. That is, the rotational motion on the user input device is translated to linear motion in a graphical user interface in only one direction such as either horizontal or vertical. The multipurpose knob can be used for navigation or scrolling through lists, matrices of choices, and the like, in multiple dimensions immediately by touching the ring 100 first in the appropriate spot. In the example provided, touching first at the top or bottom sections of the ring 100, where any motion is primarily horizontal, puts the multipurpose knob in "horizontal navigation" mode. Any subsequent motion, anywhere on the ring 100, causes horizontal parametric control such as scrolling, cursor motion, and the like. Similarly, touching first at a left or right section, where any motion is primarily vertical, puts the multipurpose knob in "vertical navigation" mode. Any subsequent motion during the same activation, anywhere on the ring 100, causes vertical parametric control such as scrolling, cursor motion, and the like. This mode of navigation is termed "tangent navigation mode" since the resulting navigation direction is tangential to the ring 100 at the initially touched spot.

Selection of a program from an electronic program guide 234 (EPG) is efficiently made using this navigation method. An EPG 234 is typically a two-dimensional array of cells in a graphical user interface. Each row represents a channel and each column a time slot. Each cell typically contains the name of the program. The scroll sensor 100 may be configured for accessing the EPG 234. At the top is a control for horizontal navigation and at the right side is a control for vertical navigation. These controls could also be placed at the bottom and right side, respectively, or duplicated to cover all four quadrants. Touching first at the top edge of the sensor 100 and then scrolling moves horizontally through the matrix of choices. Touching first at the right edge and then scrolling moves vertically through the matrix of choices. The current navigation position could be indicated by a cursor or by highlighting cells in the display matrix 234. A button (not shown) in the center of the scroll ring 100 or located elsewhere on the remote control could be pressed to select the indicated choice.

Navigation through an EPG 234 or other matrix of choices could also be achieved by reversing the scheme described above, where touching first at a top or bottom section would put the multipurpose knob into vertical mode, and touching at the left or right edges would put the knob into horizontal mode. This mode is termed "ray navigation mode," since the navigation direction is along a ray from the center of the ring 100 through the initially touched spot.

Figure 18:
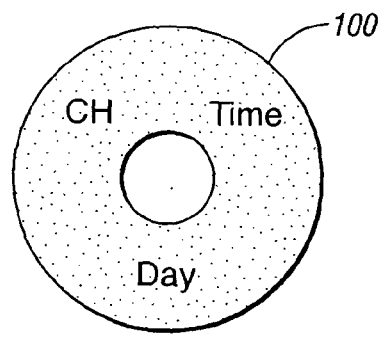
FIG. 18 is a schematic diagram illustrating control of an electronic program guide including a day control according to an embodiment of the present invention.

Referring now to FIG. 18, a schematic diagram illustrating control of an electronic program guide 234 including a day control according to an embodiment of the present invention is shown. In addition to any number of directions, the navigation functions could include any number of dimensions. For example, the two dimensions of a typical EPG (electronic program guide) 234 that are viewable at once are time on a horizontal axis and channel number on a vertical axis. A third dimension may be "day-of-the-week." On the multipurpose scroll ring 100 all of this navigation can be made immediately available. The scroll ring 100 is divided into channel, time, and day zones. "Hour" browsing could be initiated by touching initially at a top right section, "channel" browsing could be initiated by touching first at a top left section, and "day" browsing could be initiated by touching first at the bottom.

Figure 19:
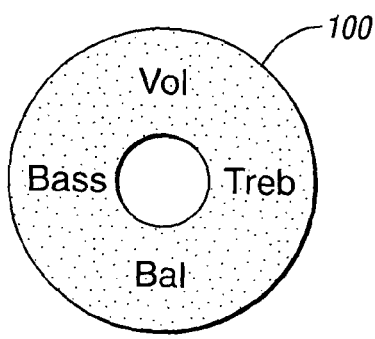
FIG. 19 is a schematic diagram illustrating audio control according to an embodiment of the present invention.

Referring now to FIG. 19, a schematic diagram illustrating audio control according to an embodiment of the present invention is shown. Home entertainment systems, automobile stereo systems, portable music players, and the like, often contain audio components. The scroll sensor 100 of the present invention enables quick control of several possible parameters by making these controls immediately available through a common method. For example, control functions may be arrayed around the ring 100 (clockwise from the top) such as volume, treble, balance and bass. Touching initially near one of the labeled controls enables scrolling to alter that parameter. Touching first at "Vol" and then scrolling clockwise or counterclockwise will increase or decrease, respectively, the audio volume from its current value. The Bass and Treble controls are similar. Touching first at "Bal" and then moving counterclockwise or clockwise will move the stereo balance from its current setting further to the right or left, respectively.

Figure 20:
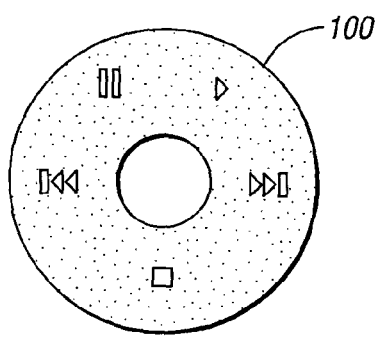
FIG. 20 is a schematic diagram illustrating control of audio playback according to an embodiment of the present invention.

Referring now to FIG. 20, a schematic diagram illustrating control of audio playback according to an embodiment of the present invention is shown. Audio playback devices, such as a player for CDs, tapes, MPEG files, and the like, require audio playback controls. Arrayed around the ring 100 clockwise from the top are controls for play, next track, stop, previous track and pause. Touching first at the top right starts playback and further scrolling causes accelerated playback in the direction of scrolling and at a speed proportional to the distance scrolled. Touching first at the lower left or lower right causes a jump to a prior or later tracks, respectively, with further scrolling causing jumps to further prior or later tracks.

Figure 21:
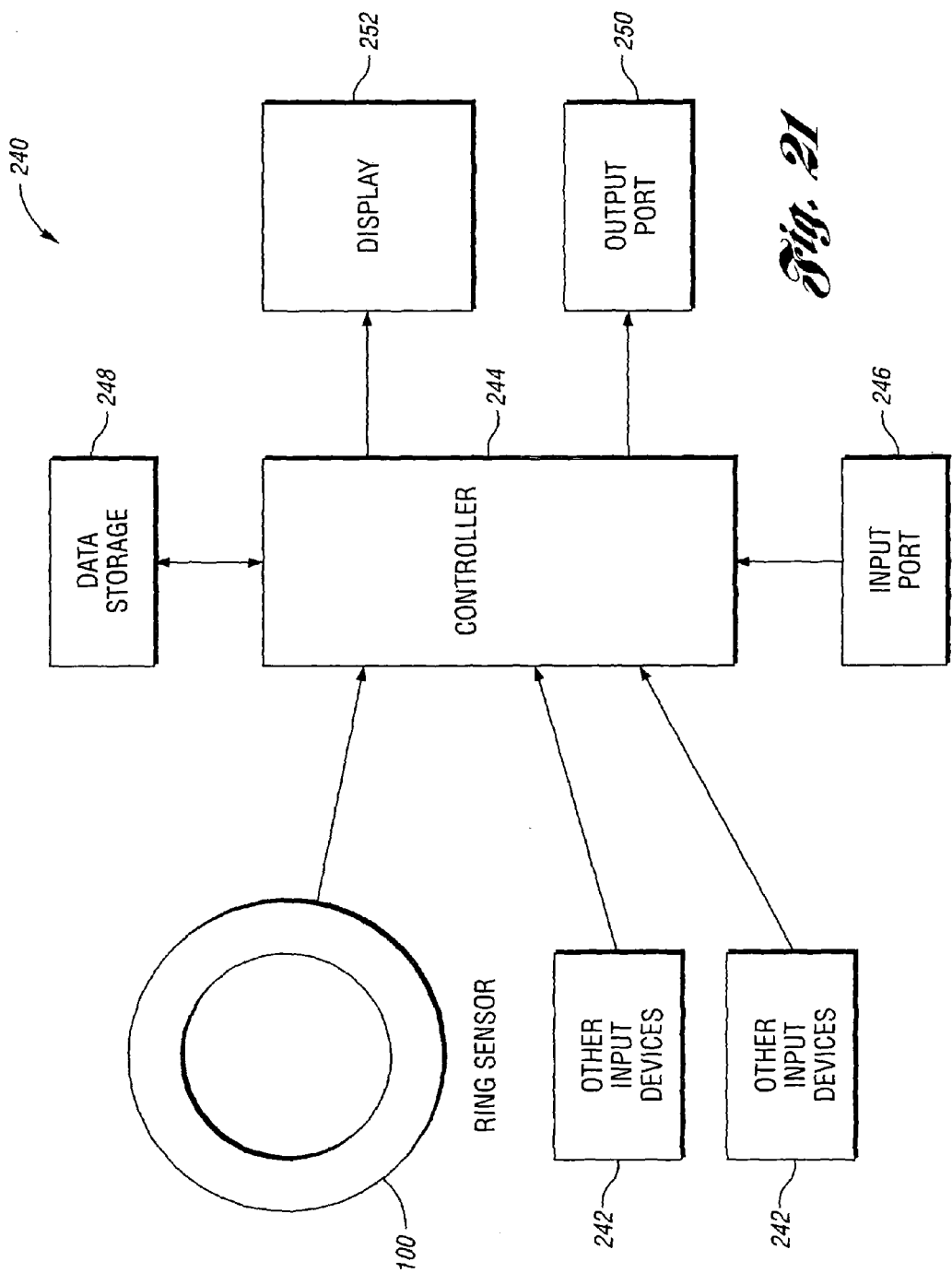
FIG. 21 is a block diagram of a portable data storage system according to an embodiment of the present invention.

Referring now to FIG. 21, a block diagram of a portable data storage system 240 according to an embodiment of the present invention is shown. Portable data storage systems 240, including media players such as MPEG audio storage and playback devices, allow digital items to be stored and easily transported. In the case of a media player, these digital items are sound files which can be played to a headphone output. Portable data storage systems 240 may also be used to carry digital items between computers or for long-term storage. In this case, an interface is provided to both load items into the system and transfer items from the system.

The example provided in FIG. 21 is for an audio media player. The system 240 includes a ring sensor 100 of the type disclosed above. Other inputs 242, such as buttons and switches, may also be provided. The ring sensor 100 and other input(s) 242 provide input signals to a controller 244 which executes software to implement the present invention. One or more input ports 246 allow digital items to be loaded into data storage 248. Input ports 246 typically include one or more serial link, wireless link, removable memory card reader, and the like. Data storage 248 typically includes one or more of solid state memory, magnetic disk, removable memory card, and the like. On playback, an item is retrieved from data storage 248 and sent to an audio output port 250 which can interface with headphones or speakers for converting to a sound signal. A display 252 is typically included to provide control information to a user such as, for example, selection lists, audio output levels, control state, battery level, and the like. If the media player 240 is also capable of displaying images, such as still pictures, video, movies, and the like, the display 252 may also offer an image viewing screen.

Video playback on the portable media player 240 may be controlled through the scroll sensor 100, for example, as described above with reference to any of FIGS. 13-15. Audio playback on the portable media player 240 may be controlled through the scroll sensor 100, for example, as described with reference to any of FIGS. 19 and 20. Menus may be traversed by using the scroll sensor 100, for example, as described above with reference to FIG. 17.

Figure 22:
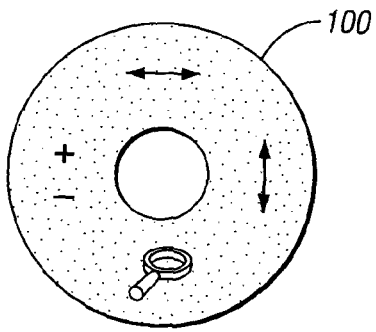
FIG. 22 is a schematic diagram illustrating control for browsing and viewing a collection of images according to an embodiment of the present invention.

Referring now to FIG. 22, a schematic diagram illustrating control for browsing and viewing a collection of images according to an embodiment of the present invention is shown. Portable media players, remote controls, personal digital assistants, wireless telephones, and the like, may be capable of holding and displaying a large number of images. In the case where a photograph is larger than can be displayed on a screen at once, the touch sensor 100 could allow for panning in two dimensions. This may be achieved by the configuration of controls illustrated in FIG. 22. Touching the sensor 100 first in a top region and then rotating could allow panning in one direction, such as horizontal. Touching first in a right side region could allow for panning in the orthogonal direction, such as vertical. Touching in a bottom region and scrolling could zoom in or zoom out on the image. Touching in a left side region and then subsequent scrolling could page through a set of images.

Figure 23:
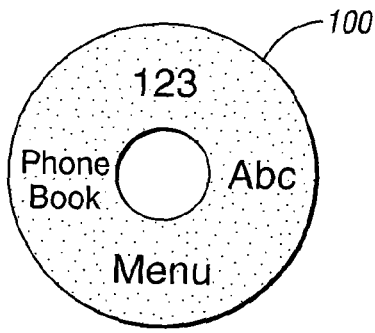
FIG. 23 is a schematic diagram illustrating control for wireless telephone control according to an embodiment of the present invention.

Referring now to FIG. 23, a schematic diagram illustrating control for wireless telephone control according to an embodiment of the present invention is shown. Wireless phones are another class of handheld devices where a touch sensor 100 according to the present invention may be advantageously applied. In addition, there are some scroll sensor 100 control configurations that enhance more typical phone tasks. FIG. 23 illustrates a control configuration that increases the efficiency of typical wireless telephone interactions. Clockwise from top, the ring sensor 100 includes controls for numerical input, text input, menu selection, and phone book. Touching first on the numerical input and then scrolling allows the immediate input of a number. When first touched, the video display of the phone would display a zero in a first digit location. Scrolling to the right would increase the number being displayed in this first location. Ceasing to touch the sensor 100 when the desired number is being displayed selects that number for that digit location and increments the digit location by one. A second number could be similarly chosen for the second digit location. A separate button (not shown) on the phone, such as a select button in the center of the scroll sensor 100, could dial the phone number that was entered.

Touching the sensor 100 first on the right side of the sensor 100 enables text input. A first letter for a first letter position is chosen by scrolling until the desired letter is displayed. Ceasing to touch the sensor 100 selects that letter and advances to a second letter position. Any number of desired letter positions could be thus filled. The letters could include upper and lower, control characters such as "shift" or "shift lock," a space, special characters such as ampersand, and punctuation. The selection of a number or a letter during numeric or text input could alternately be finalized by hitting a separate select button (not shown).

Upon touching first on "menu" and then scrolling, the user is immediately scrolling through a system of menu choices. Upon touching first upon "phone book" the user is immediately scrolling through phone book entries.

In any of the above controls, the selection of a choice after scrolling could be affected by ceasing to touch the sensor 100 after the appropriate choice has been scrolled to or, alternatively, by pressing a separate select button.

As wireless telephones become more advanced, they may include portable music and/or video players. The ring sensor 100 may allow for control of these features as described above.

Figure 24:
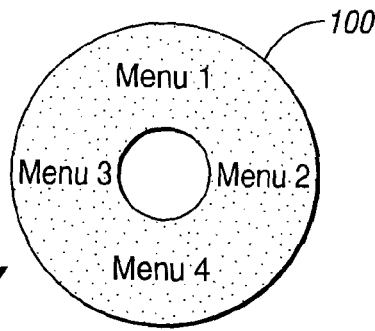
FIG. 24 is a schematic diagram illustrating a control of multiple menus according to an embodiment of the present invention.

Referring now to FIG. 24, a schematic diagram illustrating a control of multiple menus according to an embodiment of the present invention. Any device offering a plurality of menus may be easily controlled with the control sensor 100 of the present invention. In the example shown, a first touch selects between one of four menus. A second touch anywhere on the scroll sensor 100 navigates amongst menu entries. A menu entry may be selected either by ceasing the second touch or by touching another control, such as a button (not shown) at the center of the scroll sensor 100.

As will be recognized by one of ordinary skill in the art, the present invention may be applied to a wide variety of devices. The ring sensor 100 may be used to select options or navigate around a displayed map on a handheld or automotive GPS system. For this or other vehicle-based applications, the scroll sensor 100 may be mounted on the steering wheel to provide easy control access with minimal driver distraction. The present invention may also be used to control the functions of a remotely controlled camera. These functions can include pan, tilt, zoom, focus, aperture, and the like.

Any form of orthogonal, non-orthogonal or omnidirectional navigation can be easily supported by the present invention. The navigation controls disclosed above can be extended to multiple non-orthogonal directions (i.e., not just x and y). For example, the ring 100 could be separated logically into any number of zones, such that touching a zone causes all further motion on the scroll sensor 100 during the same activation period to be along a ray extending from the center of the ring 100 through the initially touched zone. There could be any discrete number or a continuum of zones implemented by the ring sensor 100.

The method of using rotational input from the sensor 100 need not be limited to a single set of functionalities. There can be multiple sets of functionalities. For example, a ring sensor 100 in a remote control for a home entertainment system could control channel and volume in one context while watching TV, navigation for choosing programs from an electronic program guide, audio parameters while listening to music, and video transport while watching a DVD. Selecting between multiple sets of functionalities could be accomplished by pressing an additional button or the control functionality could switch automatically based on context.

Figure 25:
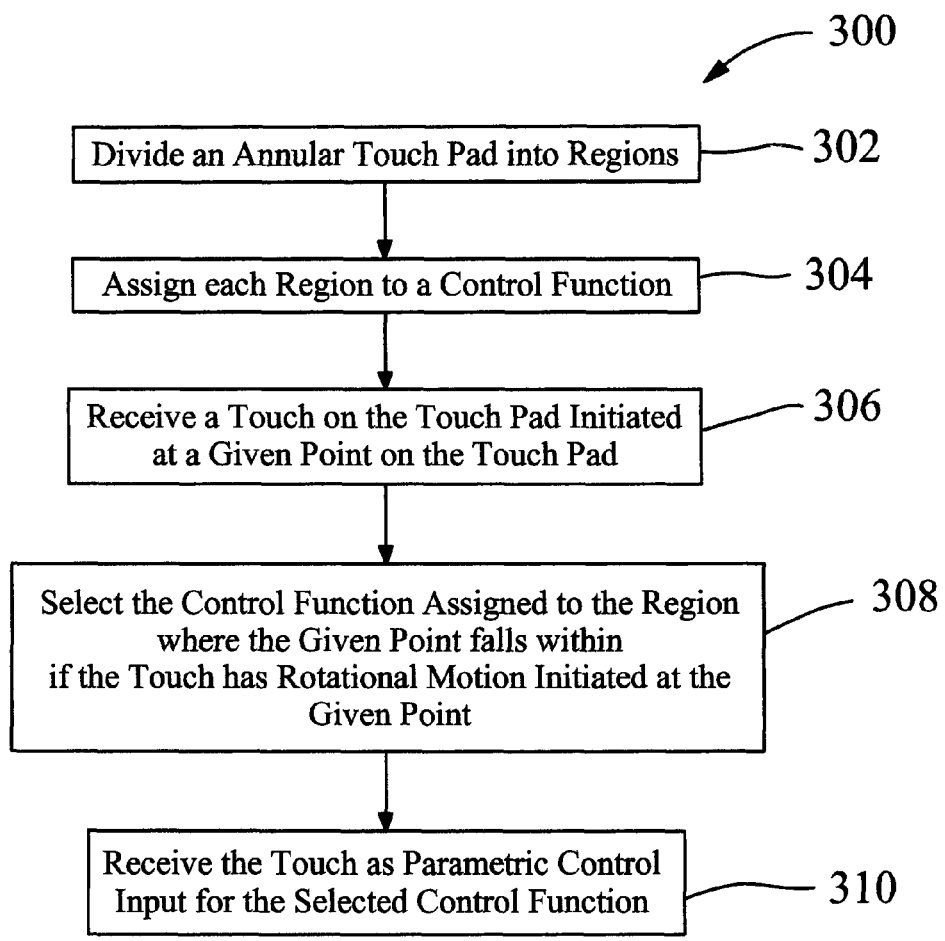
FIG. 25 is a flowchart illustrating operation of a sensor in accordance with an embodiment of the present invention.

Referring now to FIG. 25, a flowchart 300 illustrating operation of a sensor in accordance with an embodiment of the present invention is shown. The operation begins with dividing a sensor, such as an annular touch pad, into a plurality of regions as shown in block 302. Each region is assigned a control function as shown in block 304. The touch pad receives a touch initiated at a given point on the touch pad as shown in block 306. The control function assigned to the region of the touch pad where the given point falls within is selected if the touch has rotational motion initiated at the given point as shown in block 308. The touch is received as parametric control input for the selected control function as shown in block 310.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
dividing an annular touch pad into a plurality of regions;
assigning each of the plurality of regions to one of a plurality of control functions;
receiving a touch on the touch pad initiated at a given point on the touch pad; and
if the given point falls within one of the regions, selecting the control function assigned to the one of the regions and receiving the touch as parametric control input for the selected control function;
wherein selecting the control function requires that the touch has rotational motion initiated at the given point.

2. The method of claim 1 further comprising dividing the touch pad into a different plurality of regions based on the state of a controller.

3. The method of claim 1 wherein the selected control function is activated for an activation period which continues until the touch is terminated.

4. The method of claim 1 wherein the selected control function is activated for an activation period which continues for a preset amount of time after the touch is terminated.

5. The method of claim 1 wherein one of the plurality of control functions comprises volume control and wherein the parametric control input specifies a desired change in volume.

6. The method of claim 1 wherein one of the plurality of control functions comprises channel control and wherein the parametric control input specifies a desired change in channel.

7. The method of claim 1 wherein one of the plurality of control functions comprises frequency control and wherein the parametric control input specifies a desired change in frequency.

8. The method of claim 1 wherein one of the plurality of control functions comprises play list control and wherein the parametric control input specifies a desired change in a selected play list entry.

9. The method of claim 1 wherein one of the plurality of control functions comprises stored digital item control and wherein the parametric control input specifies a desired change in a selected stored digital item.

10. The method of claim 1 wherein one of the plurality of control functions comprises media play velocity control and wherein the parametric control input specifies a desired change in media play velocity.

11. The method of claim 1 wherein one of the plurality of control functions comprises media play position control and wherein the parametric control input specifies a desired change in media play position.

12. The method of claim 1 wherein the plurality of control functions comprise at least two navigation controls and wherein the parametric control input for each navigation control specifies a desired change in navigation position.

13. The method of claim 12 wherein change in navigation position comprises moving a cursor.

14. The method of claim 12 wherein change in navigation position comprises scrolling of a list of displayed items.

15. The method of claim 1 wherein the plurality of control functions comprises at least one camera control function and wherein the parametric control input specifies a desired change in at least one of pan, tilt, zoom, focus, and aperture.

16. The method of claim 1 wherein the plurality of control functions comprises at least one image viewing control and wherein the parametric control input specifies a desired change in at least one of pan, tilt, and zoom.

17. An apparatus comprising:
a scroll sensor having an annular touch sensitive control input surface, the scroll sensor providing an output signal indicative of a touch on the input surface initiated at a given point on the input surface; and
a controller in communication with the scroll sensor, the controller operative to
(a) receive the output signal from the scroll sensor,
(b) select one function from a plurality of control functions based on the given point on the input surface only if the touch has rotational motion initiated at the given point on the input surface, and
(c) provide control input for the selected function based on the touch.

18. The apparatus of claim 17 wherein the scroll sensor is part of a remote control.

19. The apparatus of claim 17 wherein the scroll sensor and the controller are part of a portable digital storage device.

20. The apparatus of claim 17 further comprising a display, the display indicating which of the plurality of control functions are selectable.

21. The apparatus of claim 17 wherein the controller is further operative to change the control functions in the plurality of control functions.

22. A remote control for use with an entertainment system, the remote control comprising:
a scroll sensor having an annular touch sensitive control input surface, the scroll sensor providing an output signal indicative of a touch on the input surface initiated at a given point on the input surface;
a transmitter for transmitting a remote control signal; and
a controller in communication with the scroll sensor and the transmitter, the controller operative to
(a) divide the input surface into at least two regions, each region corresponding to one of a plurality of remote control functions,
(b) receive the output signal from the scroll sensor,
(c) if the given point falls within one of the regions, select the remote control function corresponding to the one of the regions only if the touch has rotational motion initiated at the given point and receive the touch as parametric control input for the selected remote control function, and
(d) control the transmitter to transmit a signal specifying the parametric control input for the selected remote control function.

* * * * *